(12) United States Patent
Beuschel et al.

(10) Patent No.: US 10,753,494 B2
(45) Date of Patent: Aug. 25, 2020

(54) PNEUMATIC VALVE

(71) Applicant: Conti Temic Microelectronic GmbH, Nuremberg (DE)

(72) Inventors: Michael Beuschel, Stammham (DE); Stefan Bauer, Engelbrechtsmünster (DE); Norbert Seltner, Ingolstadt (DE); Alexander Kerler, Titting OT Petersbuch (DE)

(73) Assignee: Conti Temic Microelectronic GmbH (DE)

( * ) Notice: Subject to any disclaimer, the term of this patent is extended or adjusted under 35 U.S.C. 154(b) by 203 days.

(21) Appl. No.: 16/047,302

(22) Filed: Jul. 27, 2018

(65) Prior Publication Data
US 2019/0049026 A1 Feb. 14, 2019

(30) Foreign Application Priority Data
Aug. 8, 2017 (DE) .................. 10 2017 213 744

(51) Int. Cl.
*F16K 15/14* (2006.01)
*F16K 11/052* (2006.01)
(Continued)

(52) U.S. Cl.
CPC .............. *F16K 15/14* (2013.01); *B60N 2/665* (2015.04); *B60N 2/914* (2018.02); *F16K 11/052* (2013.01); *F16K 15/185* (2013.01); *F16K 31/025* (2013.01)

(58) Field of Classification Search
CPC ...... F16K 11/052; F16K 15/14; F16K 15/185; F16K 31/025; F16K 99/0044; B60N 2/665; B60N 2/914
(Continued)

(56) References Cited

U.S. PATENT DOCUMENTS 5,586,721 A 12/1996 Humburg
2015/0285389 A1* 10/2015 Mulder ................. F16K 15/183
137/12
(Continued)

FOREIGN PATENT DOCUMENTS

DE 4446152 A1 6/1996
DE 10359293 A1 7/2005
(Continued)

OTHER PUBLICATIONS

German Search Report for German Application No. 10 2017 213 744.4, dated Jun. 14, 2018, with partial translation—8 pages.

*Primary Examiner* — Matthew W Jellett
*Assistant Examiner* — Jonathan J Waddy
(74) *Attorney, Agent, or Firm* — RatnerPrestia

(57) ABSTRACT

A pneumatic valve, includes an air chamber with a supply port to supply compressed air into the air chamber and one or more discharge ports for discharging compressed air from the air chamber. An actuator with a movable closing element and a shape memory alloy SMA element are provided in the valve. The SMA element deforms in response to a supply of electrical heating current and effects an activation of the actuator by movement of the closing element. When the actuator is in an activated state, the closing element blocks the supply of compressed air via the supply port is blocked. When the actuator is in a deactivated state, the closing element enables the supply of compressed air via the supply port. Upon deactivation of the actuator, the closing element is moved by a restoring force into the free setting. The valve includes a check valve with an elastic element.

17 Claims, 7 Drawing Sheets

(51) Int. Cl.
    *F16K 15/18*     (2006.01)
    *F16K 31/02*     (2006.01)
    *B60N 2/66*     (2006.01)
    *B60N 2/90*     (2018.01)

(58) Field of Classification Search
    USPC .......................................................... 251/11
    See application file for complete search history.

(56) References Cited

U.S. PATENT DOCUMENTS

| | | | |
|---|---|---|---|
| 2016/0047482 A1 | 2/2016 | Kuhnekath | |
| 2018/0292019 A1* | 10/2018 | Beuschel | F16K 31/0627 |
| 2018/0301264 A1* | 10/2018 | Beuschel | H01F 7/14 |
| 2019/0049028 A1* | 2/2019 | Beuschel | F16K 31/00 |
| 2019/0118690 A1* | 4/2019 | Beuschel | F16K 27/003 |
| 2019/0353266 A1* | 11/2019 | Dorfler | F16K 27/0209 |
| 2019/0353268 A1* | 11/2019 | Dorfler | F16K 31/002 |
| 2019/0353270 A1* | 11/2019 | Dorfler | F16K 31/02 |
| 2020/0088314 A1* | 3/2020 | Samain | F03G 7/065 |
| 2020/0101883 A1* | 4/2020 | Beuschel | B60N 2/914 |
| 2020/0103047 A1* | 4/2020 | Beuschel | F16K 31/1266 |

FOREIGN PATENT DOCUMENTS

| | | |
|---|---|---|
| DE | 102013220557 A1 | 4/2015 |
| EP | 2361800 A1 | 8/2011 |
| WO | 2014154239 A1 | 10/2014 |

* cited by examiner

PNEUMATIC VALVE

CROSS REFERENCE TO RELATED APPLICATIONS

This application priority to German Patent Application No. 10 2017 213 744.4, filed Aug. 8, 2017, the contents of such application being incorporated by reference herein.

FIELD OF THE INVENTION

The invention relates to a pneumatic valve and to a device for the pneumatic adjustment of a seat, which device comprises one or more pneumatic valves.

BACKGROUND OF THE INVENTION

Pneumatic valves are used for controlling air flows in a multiplicity of technical fields of application. For example, pneumatic valves are used in means of transportation for seat adjustment. In that context, the valves are used to control the filling of elastic air bladders for shaping seat contours.

For the actuation of pneumatic valves, use is made inter alia of so-called SMA elements composed of a shape memory alloy, such as for example an NiTi alloy (SMA=Shape Memory Alloy). The SMA elements are deformed by means of a flow of current and the resulting heating. After subsequent cooling, they can resume their original shape.

Various approaches for reducing both the installation space and the production costs of pneumatic valves are known from the prior art.

Document DE 10 2013 220 557 A1, incorporated by reference herein, describes an electromagnetic valve arrangement having at least one valve, wherein a compact installation space of the valve can be achieved by arranging a longitudinal axis of the coil of an electromagnetic actuating element and a longitudinal axis of the valve at right angles to one another.

Document EP 2 361 800 B1, incorporated by reference herein, describes a pneumatic adjustment device for a seat, having a valve arrangement, wherein a fluid pressure source and the valve arrangement are disposed in a common housing. The valve arrangement of this document further exhibits 3/2-way switching valves with check valves connected upstream. In that context, the switching valves and check valves are self-contained components which are coupled to one another by additional connection parts.

SUMMARY OF THE INVENTION

The An aspect of the invention aims to provide a pneumatic valve with an actuator and integrated check valve, which is of compact construction and can be produced in a cost-effective manner.

The pneumatic valve according to an aspect of the invention comprises an air chamber with a supply port for the supply of compressed air into the air chamber and with one or more discharge ports for the discharge of compressed air out of the air chamber. Furthermore, an actuator with a movable closing element and with an SMA element composed of a shape memory alloy (e.g. an NiTi alloy) is provided in the valve, wherein the SMA element deforms as a result of a supply of electrical heating current and thereby effects an activation of the actuator by movement of the closing element. When the actuator is in an activated state, the closing element is disposed in a blocking setting in which the supply of compressed air via the supply port is blocked. When the actuator is in a deactivated state (that is to say in the absence of a supply of heating current), the closing element is disposed in a free setting in which the supply of compressed air via the supply port is enabled.

The actuator of the pneumatic valve according to an aspect of the invention is designed such that, upon deactivation of the actuator, the closing element is moved by means of a restoring force into the free setting. There is also disposed, at the supply port, a check valve with an elastic means, wherein the elastic force of the elastic means, in the free setting of the closing element, prevents a backflow of compressed air from the air chamber into the supply port in the absence of a supply of compressed air at the supply port. Preferably, in this valve, the pressure exerted by the actuator on the supply port in the blocking setting is greater, and in particular markedly greater, than the pressure exerted in the free setting by the check valve, which corresponds to the opening pressure of the check valve.

The pneumatic valve according to an aspect of the invention is characterized in that the restoring force for the movement of the closing element into the free setting is generated by the elastic means of the check valve. In other words, the elastic means performs a dual function in that it generates both the restoring force of the actuator and the elastic force of the check valve. This ensures a compact construction with low costs since only a single elastic means is required for two functions.

In one particularly preferred embodiment, the valve according to an aspect of the invention comprises a first and a second discharge port, wherein, in the free setting of the closing element in the presence of a supply of compressed air, the compressed air is allowed to flow through from the supply port to the first discharge port, and at the same time the second discharge port is blocked. By contrast, in the blocking setting of the closing element, a connection is established between the first discharge port and the second discharge port via the air chamber. Preferably, in that context, the first discharge port constitutes a discharge port to a pneumatic consumer, such as for example an air bladder. By contrast, the second discharge port is preferably a ventilation port. This variant of an aspect of the invention permits a simple realization of a 3/2-way switching valve.

In a preferred variant of the embodiment described immediately above, the cross section of the supply port is larger than, and preferably at least twice as large as, the cross section of the second discharge port. By means of the large cross section, the opening force is increased by means of compressed air at the supply port, and thus easy opening of the supply port in the free setting is realized. By contrast, owing to the small cross section of the second discharge port, an abrupt opening of said second discharge port is avoided. In this way, the generation of noise during ventilation is minimized if the second discharge port functions as a ventilation port.

In a further variant, the elastic means of the check valve comprises at least one spring, and said spring is preferably a helical or spiral spring and/or a leaf spring.

In a particularly preferred embodiment of the valve according to an aspect of the invention, the closing element of the actuator also has the function of a closing component of the check valve, wherein, in the free setting, the closing element, in its function as a closing component, shuts off the supply port in the absence of a supply of air pressure at the supply port and opens said supply port in the presence of a supply of compressed air. By virtue of the closing element functioning both as a constituent part of the actuator and as a constituent part of the check valve, a particularly compact construction of the pneumatic valve is realized.

In a further particularly preferred embodiment, the closing element comprises a tiltable valve flap which is disposed in a predefined position when the actuator is in a deactivated state and in the absence of a supply of compressed air at the supply port. By contrast, when the actuator is in an activated state, the valve flap is tilted relative to the predefined position about a first axis, whereby a sealing surface of the valve flap presses against a sealing seat of the supply port. By contrast to this, when the actuator is in a deactivated state and in the simultaneous presence of a supply of compressed air at the supply port, the valve flap is tilted relative to the predefined position about a second axis, whereby the sealing surface is lifted off from the sealing seat of the supply port. The direction of rotation of the tilting about the first axis is opposite to the direction of rotation of the tilting about the second axis. The second axis is a different axis than the first axis. The two axes run preferably parallel to one another. Furthermore, the first axis is disposed preferably at an end of the valve flap which is situated opposite the supply port. By means of the embodiment described immediately above, a simple structural realization of the valve actuating means in the manner of a rocker is realized.

In a particularly preferred variant of an aspect of the invention; in which not only the above-described tiltable valve flap but also a first and a second discharge port are provided, it is the case both in the predefined position of the valve flap and during the tilting of the valve flap about the second axis that a further sealing surface of the valve flap presses against a sealing seat of the second discharge port. By contrast, during the tilting of the valve flap about the first axis, the further sealing element is lifted off from the sealing seat of the second discharge port. In this way, the valve flap can effect the opening and closing both of the supply port and of the second discharge port. Here, the second axis is preferably disposed at an end of the valve flap which is situated opposite the second discharge port.

In a further preferred refinement of an aspect of the invention, the introduction of force by the elastic means into the valve flap takes place at a position between the first and second axes, wherein the position preferably has a smaller spacing to the second axis than to the first axis. Owing to the larger lever with respect to the first axis, a lower closing force of the check valve can be realized.

In a further preferred refinement, a stroke of the SMA element, which is effected as a result of the deformation thereof, is converted into a stroke of the closing element which is greater than the stroke of the SMA element. Accordingly, a less extensive deformation of the SMA element is required for the actuation of the valve, whereby the service life of said element is lengthened. The enlargement of the stroke is preferably realized by means of a lever arrangement.

In a particularly preferred variant of the embodiment described immediately above, the stroke of the closing element and in particular of the above valve flap is diverted relative to the stroke of the SMA element. The angle by which the stroke of the closing element is diverted relative to the stroke of the SMA element preferably lies between 50° and 130°, in particular between 70° and 100°, and is particularly preferably 90°, wherein the stated angles relate to the smaller angle between the directions of the two strokes. A compact construction of the valve according to an aspect of the invention can be achieved in this way.

In a further particularly preferred variant of the valve according to an aspect of the invention, the SMA element is a wire which extends preferably substantially in a plane. The wire is contracted as a result of a supply of the electrical heating current, and thereby effects a movement of the closing element. Nevertheless, it is also possible for the SMA element to be of some other form; for example, it may possibly also be configured as a spring, such as for example a spiral spring.

If a wire that extends in a plane is used as an SMA element, said wire preferably runs substantially parallel to the closing element (preferably to the valve flap) with a predefined spacing thereto. By means of this predefined spacing, a short lever for the action of the SMA element can be realized, in order to thereby increase the stroke.

In a further particularly preferred embodiment, the wire that forms the SMA element has two straight-running sections with a curved section situated in-between, wherein the stroke of the wire is transmitted via the curved section to the closing element. The curved section preferably turns the direction of extent of the wire through 180°. The curved section may act for example on a projection of the closing element. With this variant of an aspect of the invention, a simple mechanical coupling of the wire to the closing element is ensured.

In addition to the valve described above, an aspect of the invention relates to a device for the pneumatic adjustment of a seat in a means of transport, wherein the device comprises multiple air bladders, the filling and emptying of which effects the adjustment of the seat. Each air bladder is assigned a separately switchable valve according to an aspect of the invention, wherein all of the valves are connected via their respective supply port to a common compressed-air supply, and each air bladder is connected to a discharge port of the valve assigned thereto.

In a particularly preferred embodiment, the above pneumatic seat adjustment system is combined with the above-described variant of the valve according to an aspect of the invention, which comprises a first and a second discharge port. In that context, the first discharge port is a working port to which a respective air bladder is connected for the filling with compressed air from the compressed-air supply. Conversely, the second discharge port is a ventilation port for the ventilation of the respective air bladder. In this seat adjustment system, with corresponding configuration of the valves, a portion of the valves can be switched to the blocking setting (that is to say the ventilation position) while another portion of the valves is filled.

In a preferred variant of the embodiment described immediately above, the actuator of each valve is configured such that, in the blocking setting of the closing element, the actuator subjects the supply port to a pressure which is elevated, by the maximum admissible filling pressure of the air bladders, in relation to the pressure on the supply port that is exerted on the supply port by the check valve in the free setting of the closing element in the absence of a supply of compressed air at the supply port. In a switching setting in which a portion of the air bladders is being filled and at least one air bladder is being ventilated, it is possible with this variant, by means of the valve of the air bladder presently being ventilated, to realize an overpressure valve or a pressure-limiting valve. Specifically, if the filling pressure of the air bladders exceeds the maximum permitted filling pressure, the valve of the air bladder being ventilated switches to the free setting and thus prevents the air bladders that are presently being filled from bursting.

BRIEF DESCRIPTION OF THE DRAWINGS

Exemplary embodiments of aspects of the invention will be described in detail below on the basis of the appended figures.

In the figures.

DETAILED DESCRIPTION OF THE PREFERRED EMBODIMENTS

There follows an explanation of an aspect of the invention with reference to a pneumatic valve which is used in a device for the pneumatic adjustment of a seat in a motor vehicle by means of air bladders. Nevertheless, the valve according to an aspect of the invention may also be used in any other pneumatic applications.

Figure 1:
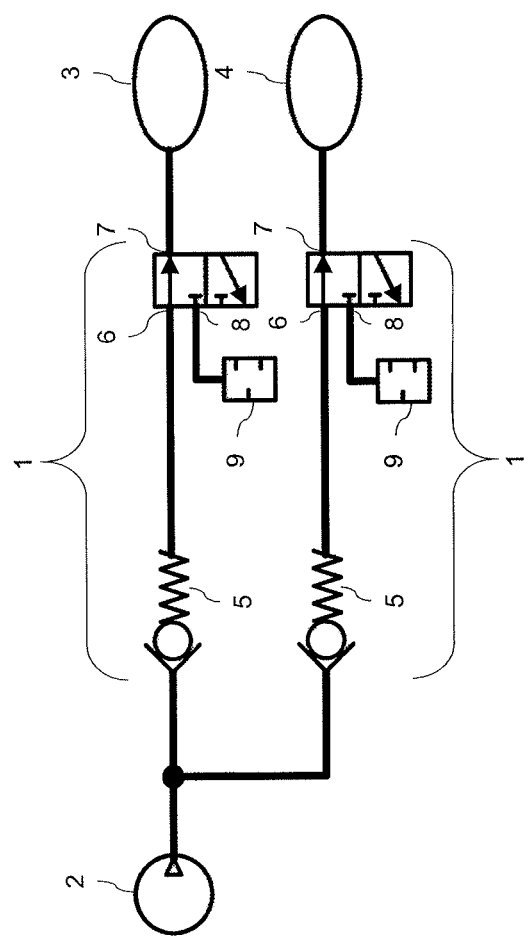
FIG. 1 shows a circuit diagram of a pneumatic seat adjustment system in which valves according to an aspect of the invention are used.

FIG. 1 shows a circuit diagram of a corresponding pneumatic seat adjustment system of a motor vehicle seat. The pneumatic seat adjustment system comprises a compressed air supply 2 in the form of a compressor which is connected, via compressed-air lines and interposed valves 1, to two air bladders 3 and 4. Here, the air bladders are integrated in the motor vehicle seat and serve for example as lumbar supports. Each valve 1 comprises a check valve 5 and a further 3/2-way valve with a feed air port 6, a working port 7 leading to the air bladder, and a ventilation port 8. Here, a damper 9 is integrated in the ventilation port. Although the pneumatic setup shown in FIG. 1 is known per se, the functionalities of the check valve and of the 3/2-way valve are now integrated in a special manner in a single pneumatic valve 1, as explained in greater detail below.

In the pneumatic seat adjustment system of FIG. 1, the two 3/2-way valves can be switched separately from one another. In the blocking setting of the respective 3/2-way valve, in which the air bladder 3 or 4 is ventilated, this valve serves to subject the feed air port 6 to a pressure higher than the pressure that the check valve 5 subjects the compressed air of the compressed air supply 2 to when the 3/2-way valve is in the free setting, that is to say when the feed air port 6 is connected to the working port 7.

The consequence of this choice of pressures is that an air bladder can be filled while the other air bladder is ventilated. To that end, the 3/2-way valve of the air bladder that is to be filled is switched into the free setting, resulting in compressed air being supplied to the air bladder by overcoming the closing force of the check valve. By contrast, the 3/2-way valve of the air bladder to be ventilated is situated in the blocking setting, which is characterized in that the compressed air of the compressed-air supply cannot open the 3/2-way valve unless a predefined maximum filling pressure is exceeded. Accordingly, the ventilation process of the corresponding air bladder can take place in parallel with the filling process of the other air bladder.

There follows an explanation of an embodiment of a pneumatic valve 1 according to an aspect of the invention which can be used in the seat adjustment system of FIG. 1. Here, the function of the 3/2-way valve in the circuit arrangement of FIG. 1 is realized by means of an SMA actuator which comprises an SMA wire composed of a shape memory alloy. Said wire is contracted by means of a supply of heating current, and thereby effects the activation of the SMA actuator.

In the embodiment of FIG. 2 to FIG. 7 as described below, the pneumatic valve 1 comprises an air-tight housing, by means of which an air chamber 10 is formed. The housing comprises a base part 12, into which there is inserted a foundation plate 11 which is illustrated with hatching in FIG. 1. The housing furthermore comprises a cover 13, which covers the foundation plate 11 from above. The cover 13 may be adhesively bonded or welded to the foundation plate 11. The foundation plate has encircling walls and comprises an air channel 18 which extends perpendicular to the plane of the drawing of FIG. 2 and which leads to a port 28 (see FIG. 3). Said port is connected via a corresponding line to a compressed-air supply, such as for example the compressed-air supply 2 from FIG. 1. At the top side of the air channel 18 there is situated an air port 6 in the form of a cylindrical opening, wherein the edge of the opening forms a sealing seat 6a.

The foundation plate 11 divides the interior space of the valve into the abovementioned air chamber 10 and a region separated from the air chamber, in which region a circuit board 22 with electronic components is situated. The air chamber 10 is closed off in pressure-tight fashion with respect to the valve surroundings and the region that contains the circuit board 22. The circuit board is thus protected with respect to the air flow that is conducted through the air chamber 10. The foundation plate 11 of the valve of FIG. 2 furthermore comprises the working port 7, to which a corresponding air bladder is connected for the filling thereof. Furthermore, a ventilation port 8 in the form of a vertically extending bore is provided, wherein the upper edge of the bore forms a sealing seat 8a. The ventilation port 8 leads via the damper 9 and a corresponding opening (not shown) in the base part 12 to the outside in order to discharge compressed air out of the closed-off air bladder.

Figure 2:
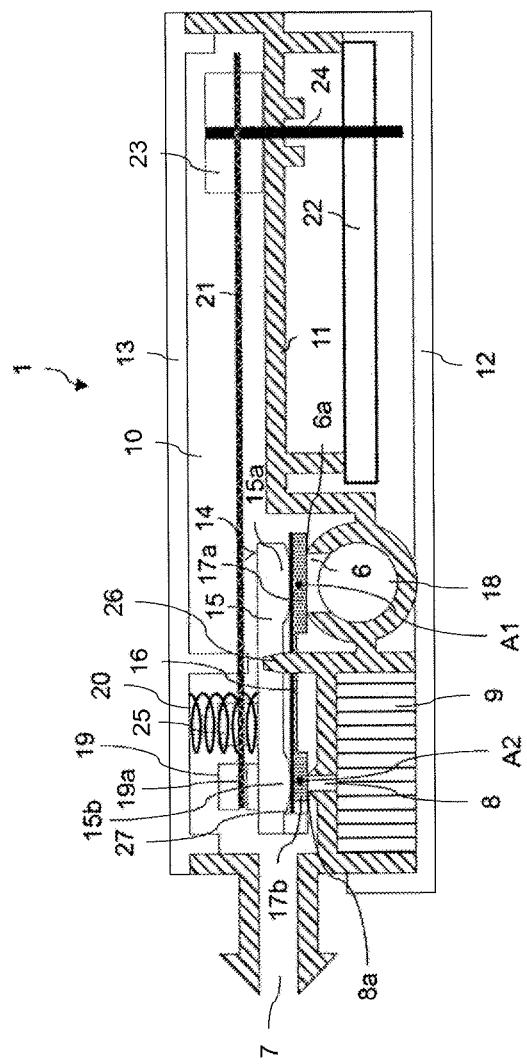
FIG. 2 shows a sectional view of an embodiment of a valve according to an aspect of the invention in the free setting in the absence of a supply of compressed air.

The actuator of the valve of FIG. 2 is a so-called SMA actuator, which comprises an SMA wire 21 composed of a shape memory alloy known per se. Said wire runs in a horizontal direction in the illustration in FIG. 2. The wire 21 is fastened to the foundation plate 11 by crimping by means of metallic crimp elements 23. Here, the exact crimped connection is not essential to an aspect of the invention, and is thus not shown in detail in FIG. 2 to FIG. 5. Electrical heating current is supplied to the SMA wire 21 via contact pins 24. For this purpose, the contact pins 24 are connected to the circuit board 22 in the lower region of the housing. Here, the supply of electrical heating power to the SMA wire 21 is controlled by means of corresponding electronic components on the circuit board 22, wherein the voltage for the supply of heating power originates for example from the on-board electrical system of the motor vehicle.

The contact pins 24 are led via corresponding lead-throughs in the foundation plate 11. Here, the foundation plate also has the task of sealing off the contact pins that are led through. This may be realized by virtue of the corresponding pins being molded in, by virtue of said pins being pressed in (possibly through an elastic seal), or by virtue of said pins being adhesively bonded. Since the electronic components of the valve are seated on the separate circuit board 22, the foundation plate 11 requires no electrical conductor tracks, such that it can be manufactured from plastic. In particular, it constitutes an injection-molded component, whereby the integral formation of the air ports 6, 7 and 8 in the foundation plate is made possible. As material for the foundation plate, use is preferably made of a plastic which exhibits little warping and little distortion; it is also possible, if appropriate, for an insert to be provided in the region of the sealing seats of the individual air ports, or the plastic may be formed from a different material at these locations. For example, the region of the sealing seats may be produced from a plastic without fiber reinforcement, whereas the rest of the foundation plate comprises such fibers in order to increase the stability thereof. Through the use of non-reinforced plastic in the region of the sealing seats, the sealing in the case of closed ports can be improved.

The SMA actuator comprises, in addition to the SMA wire 21, a valve flap 14 which comprises a valve body 15, a metallic leaf spring 16 and two sealing pads or sealing elements 17a and 17b for sealing off the air ports 6 and 8 respectively. Here, the leaf spring is held in an undercut 27 on the left-hand end of the valve body 15. The sealing elements 17a and 17b are attached to the underside of the leaf spring 16. In the region of the sealing elements 17a and 17b, the leaf spring 16 lies with its top side against respective cylindrical protuberances 15a and 15b of the valve body 15. Also provided on the top side of the valve body 15 is a diverting element 19 in the form of a semicircular projection with a channel 19a integrated therein, wherein the SMA wire 21 is received in the channel. Furthermore, a cross-shaped projection 25 projects from the top side of the valve body 15, which projection serves for guiding a helical or spiral spring 20 which is disposed between the top side of the valve body 15 and the bottom side of the cover 13.

Figure 3:
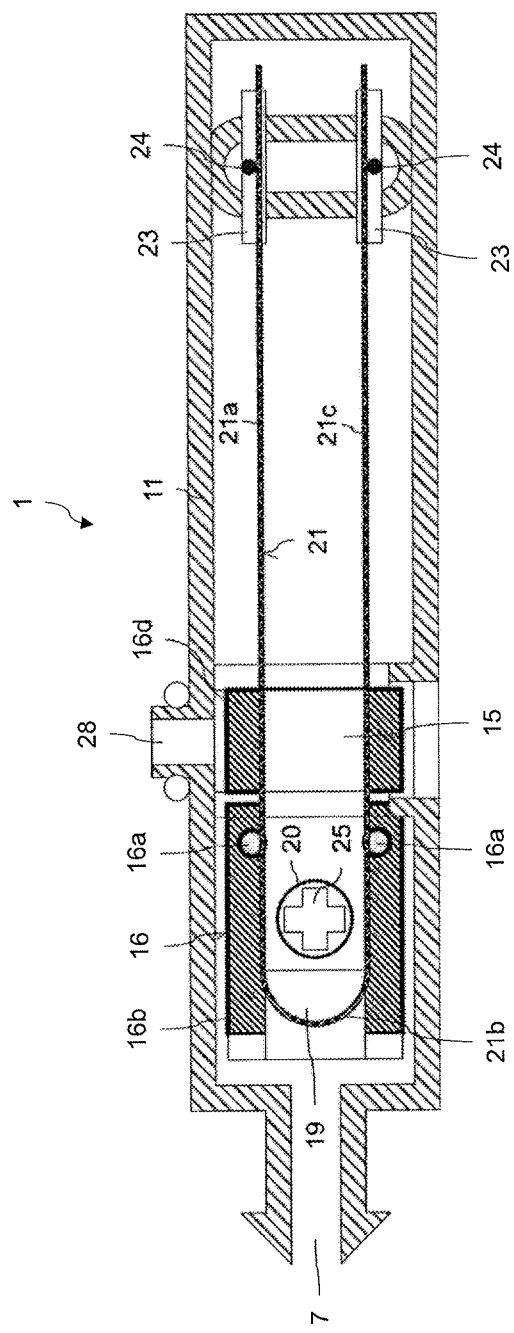
FIG. 3 shows a partially sectional plan view of the valve of FIG. 2.

In the foundation plate 11, there are also formed two vertically running pins 26 which are inserted into corresponding openings 16a of the leaf spring 16, as can be seen from the view of FIG. 3. The pins serve for guiding the valve flap 14 in a vertical direction. Here, by means of the leaf spring 16, tilting of the valve flap 14 about two imaginary axes A1 and A2 is made possible. In the illustration of FIG. 2, said axes run perpendicular to the plane of the drawing. The axis A1 is disposed opposite the feed air port 6, whereas the axis A2 is positioned opposite the ventilation port 8. The two axes A1 and A2 are parallel to one another. By means of the described construction, a valve actuation in the manner of a rocker is effected, which, depending on the valve position, permits tilting about the imaginary axis A1 or the imaginary axis A2, as will be discussed in more detail further below.

The guidance of the SMA wire 21 can be seen from the sectional view of FIG. 3. As can be seen, the wire is fastened at its right-hand ends to the housing by means of respective crimp elements 23. In FIG. 3, the wire extends, proceeding from an upper crimp element 23 and an upper contact pin 24, initially as a straight section 21a in the direction of the valve flap. There, said wire is led as a curved section 21b in the channel 19a of the diverting means 19. The wire subsequently transitions into a straight section 21c again, which leads to a further crimp element 23 and a corresponding contact pin 24. The diverting means 19 is an integral constituent part of the valve body 15 composed of plastic. As already mentioned, a spiral spring 20 is situated around the cross-shaped projection 25, which spiral spring preloads the valve flap in a downward direction. It can also be seen from FIG. 3 that the width of the leaf spring 16 is greater than the width of the valve body 15. The two openings 16a are in this case formed at an edge region of the leaf spring which is not covered by the valve body.

Figure 6:
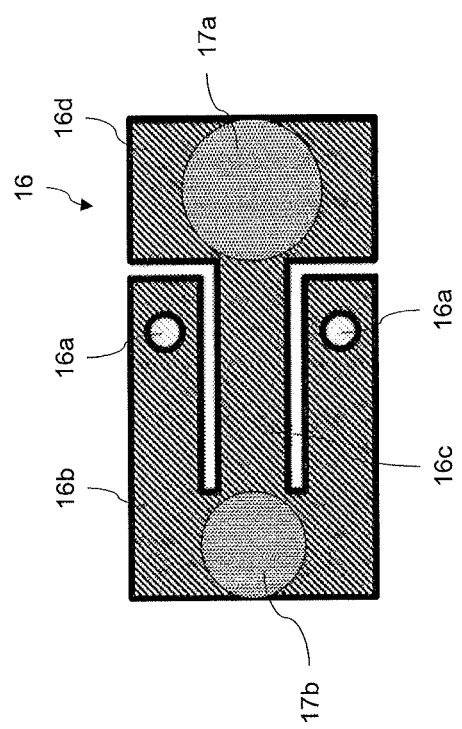
FIG. 6 shows a plan view of the leaf spring of the valve shown in FIG. 2 to FIG. 5.

The exact construction of the leaf spring 16 can be seen once again in FIG. 6, which shows the leaf spring on its own in a plan view. As can be seen, the leaf spring has a U-shaped section 16b, wherein the openings 16a are formed at the respective ends of the U-shaped section 16b. The U-shaped section is connected by means of a web 16c to a straight section 16d. Also indicated in FIG. 6 are the positions of the sealing elements 17a and 17b. As can be seen, the sealing element 17a is disposed centrally on the straight section 16d, whereas the sealing element 17b is situated at the lower end of the U-shaped section 16b. By means of the shaping illustrated in FIG. 6, suitable bending of the metallic leaf spring is made possible, as will be described in more detail below.

An essential aspect of the embodiment described here consists in that the valve flap 14 with the leaf spring 16 and the spiral spring 20 perform not only the function of opening and shutting off the air ports 6 and 8 but also the function of a check valve 5 for the feed air port 6. Here, the spiral spring 20 in combination with the leaf spring 16 constitutes an embodiment of an elastic means of the check valve within the meaning of claim 1. The elastic force of said elastic means is, in the exemplary embodiment shown, effected primarily by the spiral spring 20 and only to a very small extent by the leaf spring 16. In modified embodiments, the function of the elastic means may also be effected purely by the spiral spring 20, wherein the leaf spring may in this case be omitted. Here, it must however be ensured that suitable tilting of the valve flap is ensured by means of corresponding play. It is likewise possible for the function of the elastic means to be effected only by the leaf spring 16. In this case, by means of suitable pre-bending of the leaf spring, it must be ensured that an adequately large elastic force is provided for the check valve.

The functioning of the valve will be described below on the basis of FIGS. 2, 4, 5 and 7. FIG. 2 shows the free setting of the valve in the absence of a supply of compressed air via the air channel 18. In this free setting, no heating current is supplied to the SMA wire, that is to say the actuator is in the deactivated state. In this switching setting, the ventilation port 8 is closed by means of the sealing element 17b. Here, the sealing element 17b is pressed against the sealing seat 8a by means of the spring force of the spiral spring 20. At the same time, the spiral spring 20 also exerts a pressure on the sealing element 17a, which pressure is however lower than the pressure on the sealing element 17b. This can be seen once again from the lever ratios depicted in FIG. 7.

Figure 7:
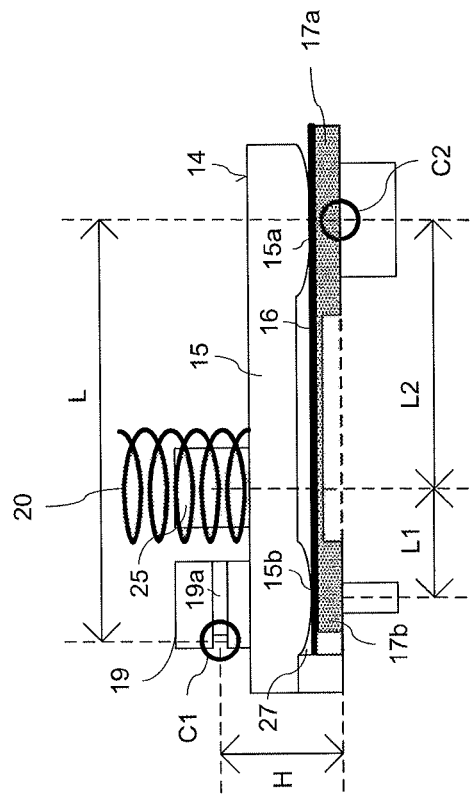
FIG. 7 shows a detailed view of the valve flap of the valve from FIG. 2 to FIG. 5.

FIG. 7 shows the valve flap 14 together with the spiral spring 20 in detail. Here, the point of action of the SMA wire 21 on the diverting means 19 is highlighted by the circle C1. Analogously, the articulation of the lever arm during the tilting about the axis A2 is depicted by the circle C2. Here, the lever arm in the case of the rotation about the axis A2 has the length L. By contrast, the lever arm in a vertical direction has a much shorter length, which is defined by the height H between the circle C1 and the underside of the valve flap 14. This leads to a considerable increase in the stroke during activation of the SMA actuator, as will be discussed in more detail further below.

It can also be seen from FIG. 7 that the introduction of force by the spiral spring 20 has a spacing L1 to the central point of the sealing element 17b and a spacing L2 to the central point of the sealing element 17a, wherein L1 is considerably smaller than L2. As a result, the force acting on the sealing seat 8a in the switching setting of FIG. 2 is considerably greater than the force acting on the sealing seat 6a. This force distribution is also desirable because, in the switching setting of FIG. 2, the valve flap 14 functions as a check valve which is intended to permit a lift-off of the sealing element 17a in the presence of a supply of compressed air at the feed air port 6 and only prevent a backflow of compressed air from the working port 7 to the feed air port 6 when the supply of compressed air is withdrawn.

Figure 4:
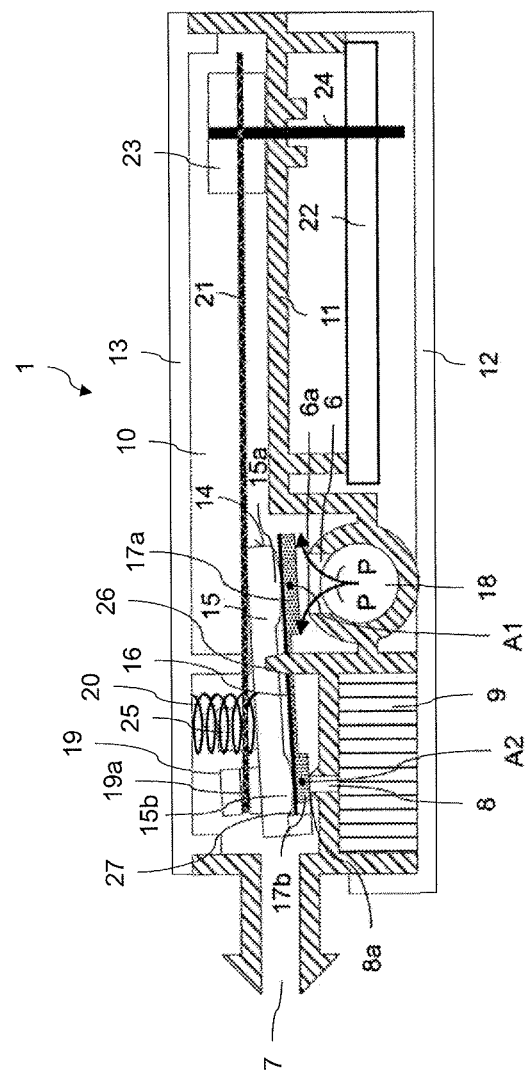
FIG. 4 shows a sectional view of the valve from FIG. 2 in the free setting in the presence of a supply of compressed air.

FIG. 4 shows the free setting of the valve from FIG. 2, wherein it is however now the case that compressed air is being conducted to the feed air port 6 via the air channel 18. Owing to the introduction of force by the spiral spring 20 with a relatively large spacing to the sealing element 17a, tilting of the valve flap 14 about the imaginary axis A2, and thus an ingress of compressed air into the air chamber 10, are effected, as indicated by the arrows P, in the presence of a low pressure. At the same time, the ventilation port 8 is closed off by means of the sealing element 17b. Thus, in the switching setting of FIG. 4, compressed air is conducted via the feed air port 6, the air chamber 10 and the working port 7 to the connected air bladder.

Figure 5:
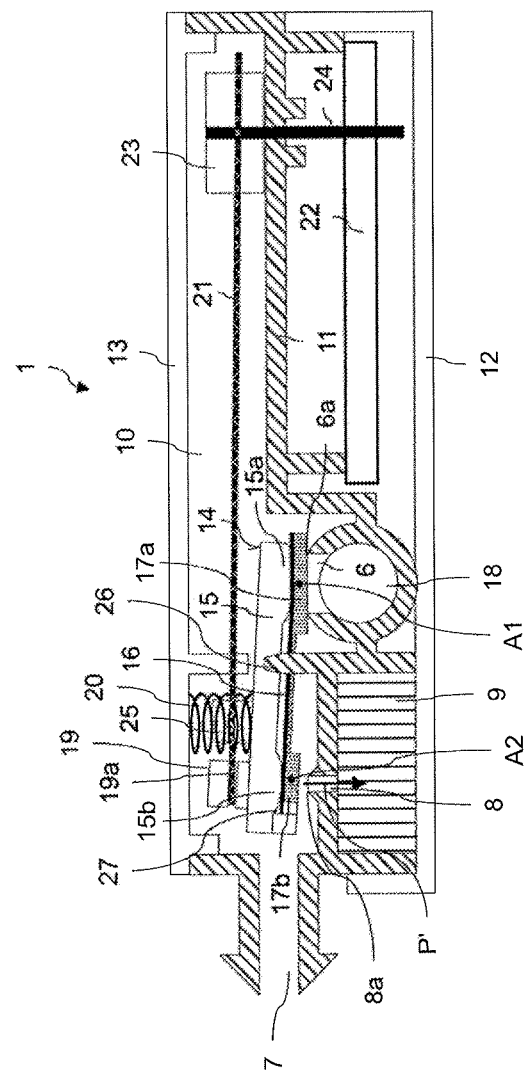
FIG. 5 shows a sectional view of the valve from FIG. 2 in the blocking setting.

FIG. 5 shows the blocking setting of the valve from FIG. 2 and FIG. 4, wherein, in the blocking setting, heating current is supplied to the SMA wire 21 via the contact pins 24. The heating current effects a contraction of the wire 21, with the result that the valve flap is now tilted about the imaginary axis A1. Here, the spiral spring 20 and the leaf spring 16 have the function of providing a restoring force which, upon a later deactivation of the actuator by interruption of the heating current, effects a return movement of the valve flap into the free setting of FIG. 2. Owing to the lever ratios indicated in FIG. 7, with a small lever arm H and large lever arm L, the stroke of the SMA wire 21 is converted into a much larger stroke of the valve flap 14.

By means of the tilting about the axis A1, an opening of the sealing seat 8a and a simultaneous closure of the sealing seat 6a are effected. Accordingly, in the switching setting of FIG. 5, a ventilation of the air bladder via the working port 7 and the ventilation port 8 is effected, as indicated by the arrow P'. In the switching setting of FIG. 5, the force of the spiral spring 20 acts only on the sealing element 17a and thus on the feed air port 6. Thus, in this switching setting, the closing pressure of the sealing element 17a is significantly higher than the closing pressure that prevails in the switching setting of FIG. 2, in which the valve flap performs the function of a check valve.

As emerges from the above description, the free setting of FIG. 2 or FIG. 4, in the case of which the actuator is not activated, is utilized for the filling of an air bladder connected to the working port 7. Here, the compressed air passes via the feed air port 6, by means of a lift-off of the sealing element 17a, into the air chamber 10 and from there to the air bladder. When the air bladder has been adequately filled, the compressed-air supply is deactivated. Owing to the function of the valve flap 14 as a check valve, the spiral spring 20 closes off the feed air port 6, such that the air from the air bladder cannot flow back into the air channel 18. Here, the pressure in the interior of the valve housing effects an additional closing force for the check valve. For the ventilation, the actuator is activated by contraction of the SMA wire, whereupon the feed air port 6 is closed off by means of the sealing element 17a, whereas the ventilation port 8 is freed, such that the compressed air from the air bladder can flow to the outside via the ventilation port.

As already mentioned above, several of the above-described variants of the valves may be used in the pneumatic seat adjustment system of FIG. 1. Here, the opening pressure required at the feed air port in the blocking setting of the respective valve is considerably higher than the opening pressure in the free setting, in which the valve flap acts as a check valve. In one preferred variant, the valves 1 are in this case configured such that, upon the transition to the blocking setting by means of a supply of heating current to the SMA wire, the pressure on the corresponding sealing seat of the feed air port is increased by the maximum admissible filling pressure of the air bladders. In other words, upon activation of the valve, the opening pressure of the check valve is raised by the maximum admissible filling pressure of the air bladders. This has particular advantages in the event that the seat adjustment system of FIG. 1 fills one air bladder while the other air bladder is being ventilated. In this case, the check valve of the air bladder being ventilated, which check valve is in the blocking setting, acts as an overpressure valve or a pressure-limiting valve. Here, if the maximum admissible filling pressure of the air bladder being filled is exceeded, this leads to the feed air port of the valve of the other air bladder being freed, thus preventing the air bladder being filled from bursting.

As discussed above, the described variant of the valve according to an aspect of the invention is used in a pneumatic arrangement that comprises two air bladders. Nevertheless, the arrangement may also comprise further air bladders, with each air bladder being actuated by means of a corresponding valve according to an aspect of the invention. As long as at least one air bladder is ventilated during the filling of the air bladders, the abovementioned advantage, according to which the valve of the air bladder being ventilated acts as an overpressure valve or a pressure-limiting valve, is also achieved in such an arrangement if the valves are configured appropriately.

The above-described embodiments of an aspect of the invention have numerous advantages. In particular, the double function of an elastic means for providing a restoring force of a 3/2-way valve and a closing force of a check valve makes it possible to achieve a compact construction of the valve and to reduce production costs. Furthermore, an appropriate configuration of the valves in a pneumatic seat adjustment system can serve to provide suitable overpressure protection. In addition, the valve according to an aspect of the invention can be installed in a more lightweight manner than conventional switching valves, owing to its space-saving configuration.

LIST OF REFERENCE SIGNS

1 Valve
2 Compressed-air supply
3, 4 Air bladders
5 Check valve
6 Feed air port
6a Sealing seat
7 Working port
8 Ventilation port
8a Sealing seat
9 Damper
10 Air chamber
11 Foundation plate
12 Base part 13 Cover
14 Valve flap
15 Valve body
16 Leaf spring
16a Holes in the leaf spring
16b U-shaped section of the leaf spring
16c Web of the leaf spring
16d Straight section of the leaf spring
17a, 17b Sealing elements
18 Air channel
19 Diverting means
20 Spiral spring
21 SMA wire
21a, 21c Straight sections of the SMA wire
21b Semicircular section of the SMA wire
22 Circuit board
23 Crimp elements
24 Contact pins
25 Cross-shaped projection
26 Pins
27 Undercut
28 Air channel port
A1, A2 Axes
P, P' Arrows
C1, C2 Circles
H Height
L, L1, L2 Horizontal lengths

The invention claimed is:

1. A pneumatic valve, comprising:
an air chamber with a supply port for the supply of compressed air into the air chamber and with one or more discharge ports for the discharge of compressed air out of the air chamber;
an actuator with a movable closing element and with an SMA element composed of a shape memory alloy are provided in the valve,
wherein the SMA element deforms as a result of a supply of electrical heating current and effects an activation of the actuator by movement of the closing element,
wherein, when the actuator is in an activated state, the closing element is disposed in a blocking setting in which the supply of compressed air via the supply port is blocked, and wherein, when the actuator is in a deactivated state, the closing element is disposed in a free setting, in which the supply of compressed air via the supply port is enabled, and
wherein the actuator is configured such that, upon deactivation of the actuator, the closing element is moved by a restoring force into the free setting; and
a check valve with an elastic means, the closing element of the actuator forming a portion of the check valve,
wherein an elastic force of the elastic means, in the free setting of the closing element, prevents a backflow of compressed air from the air chamber into the supply port in the absence of a supply of compressed air at the supply port, and
wherein the restoring force for the movement of the closing element into the free setting is generated by the elastic means.

2. The pneumatic valve as claimed in claim 1, wherein the one or more discharge ports are a first discharge port and a second discharge port, wherein, in the free setting of the closing element in the presence of a supply of compressed air, the compressed air flows through from the supply port to the first discharge port, and at the same time the second discharge port is blocked, and wherein, in the blocking setting of the closing element, a connection is established between the first discharge port and the second discharge port via the air chamber.

3. The pneumatic valve as claimed in claim 2, wherein a cross section of the supply port is larger than a cross section of the second discharge port.

4. The pneumatic valve as claimed in claim 3, wherein the cross section of the supply port is at least twice as large as the cross section of the second discharge port.

5. The pneumatic valve as claimed in claim 1, wherein the elastic means comprises at least one spring.

6. The pneumatic valve as claimed in claim 1, wherein, in the free setting, the closing element, in its function as a closing component, shuts off the supply port in the absence of a supply of compressed air at the supply port and opens said supply port in the presence of a supply of compressed air.

7. The pneumatic valve as claimed in claim 1, wherein the closing element comprises a tiltable valve flap which is disposed in a predefined position when the actuator is in the deactivated state and in the absence of a supply of compressed air at the supply port,
wherein, when the actuator is in the activated state, the valve flap is tilted relative to the predefined position about a first axis and presses a sealing surface of the valve flap against a sealing seat of the supply port, and
wherein, when the actuator is in the deactivated state and in the simultaneous presence of a supply of compressed air at the supply port, the valve flap is tilted relative to the predefined position about a second axis and lifts the sealing surface off from the sealing seat of the supply port, wherein the direction of rotation of the tilting about the first axis is opposite to the direction of rotation of the tilting about the second axis.

8. The pneumatic valve as claimed in claim 7, wherein the first axis is disposed at an end of the valve flap which is situated opposite the supply port.

9. The pneumatic valve as claimed in claim 7 wherein the one or more discharge ports are a first discharge port and a second discharge port ,
wherein, in the free setting of the closing element in the presence of a supply of compressed air, the compressed air flows through from the supply port to the first discharge port, and at the same time the second discharge port is blocked, and wherein, in the blocking setting of the closing element, a connection is established between the first discharge port and the second discharge port via the air chamber, and
wherein, both in the predefined position of the valve flap and during the tilting of the valve flap about the second axis, a further sealing surface of the valve flap presses against a sealing seat of the second discharge port, wherein, during the tilting of the valve flap about the first axis, the further sealing element is lifted off from the sealing seat of the second discharge port.

10. The pneumatic valve as claimed in claim 9, wherein the second axis is disposed at an end of the valve flap which is situated opposite the second discharge port.

11. The pneumatic valve as claimed in claim 7, wherein the introduction of the elastic force into the valve flap takes place at a position between the first and second axes, wherein the position of the elastic force has a smaller spacing to the second axis than to the first axis.

12. The pneumatic valve as claimed in claim 1, wherein a stroke of the SMA element, which is effected as a result of the deformation thereof, is converted into a stroke of the closing element which is greater than the stroke of the SMA element.

13. The pneumatic valve as claimed in claim 1, wherein the SMA element is a wire which is contracted as a result of a supply of the electrical heating current and which thereby effects the movement of the closing element.

14. A device for the pneumatic adjustment of a seat in a means of transport, comprising:
multiple air bladders, the filling and emptying of which effects the adjustment of the seat, wherein each air bladder is assigned a separate pneumatic value as claimed in claim 1, wherein all of the pneumatic valves are connected via their respective supply port to a common compressed-air supply, and each air bladder is connected to a discharge port of the pneumatic valve assigned thereto.

15. The pneumatic valve as claimed in claim 1, wherein the elastic means comprises at least one helical spring and/or a leaf spring.

16. A device for the pneumatic adjustment of a seat in a means of transport, comprising:
multiple air bladders, the filling and emptying of which effects the adjustment of the seat, wherein each air bladder is a separate pneumatic valve comprises:
an air chamber with a supply port for the supply of compressed air into the air chamber and with one or more discharge ports for the discharge of compressed air out of the air chamber;
an actuator with a movable closing element and with an SMA element composed of a shape memory alloy are provided in the valve,
wherein the SMA element deforms as a result of a supply of electrical heating current and effects an activation of the actuator by movement of the closing element,
wherein, when the actuator is in an activated state, the closing element is disposed in a blocking setting in which the supply of compressed air via the supply port is blocked, and wherein, when the actuator is in a deactivated state, the closing element is disposed in a free setting, in which the supply of compressed air via the supply port is enabled, and
wherein the actuator is configured such that, upon deactivation of the actuator, the closing element is moved by a restoring force into the free setting;
a check valve with an elastic means, the closing element of the actuator forming a portion of the check valve,
wherein an elastic force of the elastic means, in the free setting of the closing element, prevents a backflow of compressed air from the air chamber into the supply port in the absence of a supply of compressed air at the supply port, and
wherein the restoring force for the movement of the closing element into the free setting is generated by the elastic means; and
the one or more discharge ports are a first discharge port and a second discharge port, wherein, in the free setting of the closing element in the presence of a supply of compressed air, the compressed air flows through from the supply port to the first discharge port, and at the same time the second discharge port is blocked, and wherein, in the blocking setting of the closing element, a connection is established between the first discharge port and the second discharge port via the air chamber,
wherein the first discharge port is a working port to which a respective air bladder is connected for the filling with compressed air from a compressed-air supply, and wherein the second discharge port is a ventilation port for the ventilation of the respective air bladder, and
wherein all of the pneumatic valves are connected via their respective supply port to a common compressed-air supply, and each air bladder is connected to a discharge port of the pneumatic valve assigned thereto.

17. The device as claimed in claim 16, wherein the actuator of each pneumatic valve is configured such that, in the blocking setting of the closing element, the actuator subjects the supply port to a pressure which is elevated, by the maximum admissible filling pressure of the air bladders, in relation to the pressure on the supply port that is exerted on the supply port by the check valve in the free setting of the closing element in the absence of a supply of compressed air at the supply port.

* * * * *